(12) United States Patent
Ogino

(10) Patent No.: US 7,287,163 B2
(45) Date of Patent: Oct. 23, 2007

(54) DIGITAL WATERMARK EMBEDDING APPARATUS AND METHOD, AND COMPUTER PROGRAM

(75) Inventor: Akira Ogino, Tokyo (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 10/279,072

(22) Filed: Oct. 24, 2002

(65) Prior Publication Data

US 2003/0081779 A1  May 1, 2003

(30) Foreign Application Priority Data

Oct. 30, 2001   (JP) .............................. 2001-332441

(51) Int. Cl.
*H04L 9/00* (2006.01)
(52) U.S. Cl. ...................... 713/176; 358/3.28; 283/113
(58) Field of Classification Search ................ 713/176, 713/100; 382/100, 173, 181, 177–178, 294, 382/232, 276; 380/201; 358/3.28; 283/113
See application file for complete search history.

(56) References Cited

U.S. PATENT DOCUMENTS

| 5,953,456 | A | * | 9/1999 | Ikeda et al. ................. 382/232 |
| 6,415,041 | B1 | * | 7/2002 | Oami et al. .................. 382/100 |
| 6,674,874 | B1 | * | 1/2004 | Yoshida et al. ............. 382/100 |
| 6,757,405 | B1 | * | 6/2004 | Muratani et al. ........... 382/100 |
| 6,809,792 | B1 | * | 10/2004 | Tehranchi et al. ............ 352/85 |

FOREIGN PATENT DOCUMENTS

| JP | 11-55639 | 2/1999 |
| JP | 2000-244726 | 9/2000 |
| JP | 2001-8019 | 1/2001 |
| JP | 2001-24877 | 1/2001 |
| JP | 2001-275115 | 10/2001 |

* cited by examiner

*Primary Examiner*—T. B. Truong
(74) *Attorney, Agent, or Firm*—Oblon, Spivak, McClelland, Maier & Neustadt, P.C.

(57) ABSTRACT

A digital watermark embedding apparatus divides data to be watermarked into a plurality of data areas on the basis of data characteristics, in time series, or on the basis of user selection and performs digital watermark embedding in which different algorithms are applied to the separate data areas. Unlike schemes that embed digital watermarks using an algorithm that is uniform with all data areas, a digital watermark can be embedded in accordance with each data area of an image. When the algorithm is selected in accordance with user input, the embedding algorithm can be selected in accordance with the characteristics of the human vision or auditory sense. Image/audio quality control and detection performance improvement are thus made possible, and deterioration in data quality can be prevented.

20 Claims, 14 Drawing Sheets

FIG. 6

| ALGORITHM IDENTIFIER (ID) | ALGORITHM |
|---|---|
| (1) | $L(i, j) = a$ (a:const.) |
| (2) | $L(i, j) = \|-1.0 \quad 2.0 \quad -1.0\|$ |
| (3) | $L(i, j) = \begin{pmatrix} -1.0 & -1.0 & -1.0 \\ -1.0 & 8.0 & -1.0 \\ -1.0 & -1.0 & -1.0 \end{pmatrix}$ |
| (4) | $L(i, j) = \begin{pmatrix} -0.0 & -1.0 & -0.0 \\ -1.0 & 4.0 & -1.0 \\ -0.0 & -1.0 & -0.0 \end{pmatrix}$ |
| (5) | $L(i, j) = \alpha V(i, j)$ OR $\alpha A(t)$<br>CONTROL BY LUMINANCE OR AUDIO LEVEL |
| (6) | $L(i, j) = \alpha P(m, n)$ |

FIG. 13

| | FIRST COMBINATION | SECOND COMBINATION |
|---|---|---|
| HIGH FREQUENCY/ EDGE AREA | (4) $L(i,j) = \begin{pmatrix} -0.0 & -1.0 & -0.0 \\ -1.0 & 4.0 & -1.0 \\ -0.0 & -1.0 & -0.0 \end{pmatrix}$ | (3) $L(i,j) = \begin{pmatrix} -1.0 & -1.0 & -1.0 \\ -1.0 & 8.0 & -1.0 \\ -1.0 & -1.0 & -1.0 \end{pmatrix}$ |
| LOW FREQUENCY/ FLAT AREA | (1) $L(i,j) = a$ (a:const.) | (5) $L(i,j) = \alpha V(i,j)$ OR $\alpha A(t)$ CONTROL BY LUMINANCE OR AUDIO LEVEL |

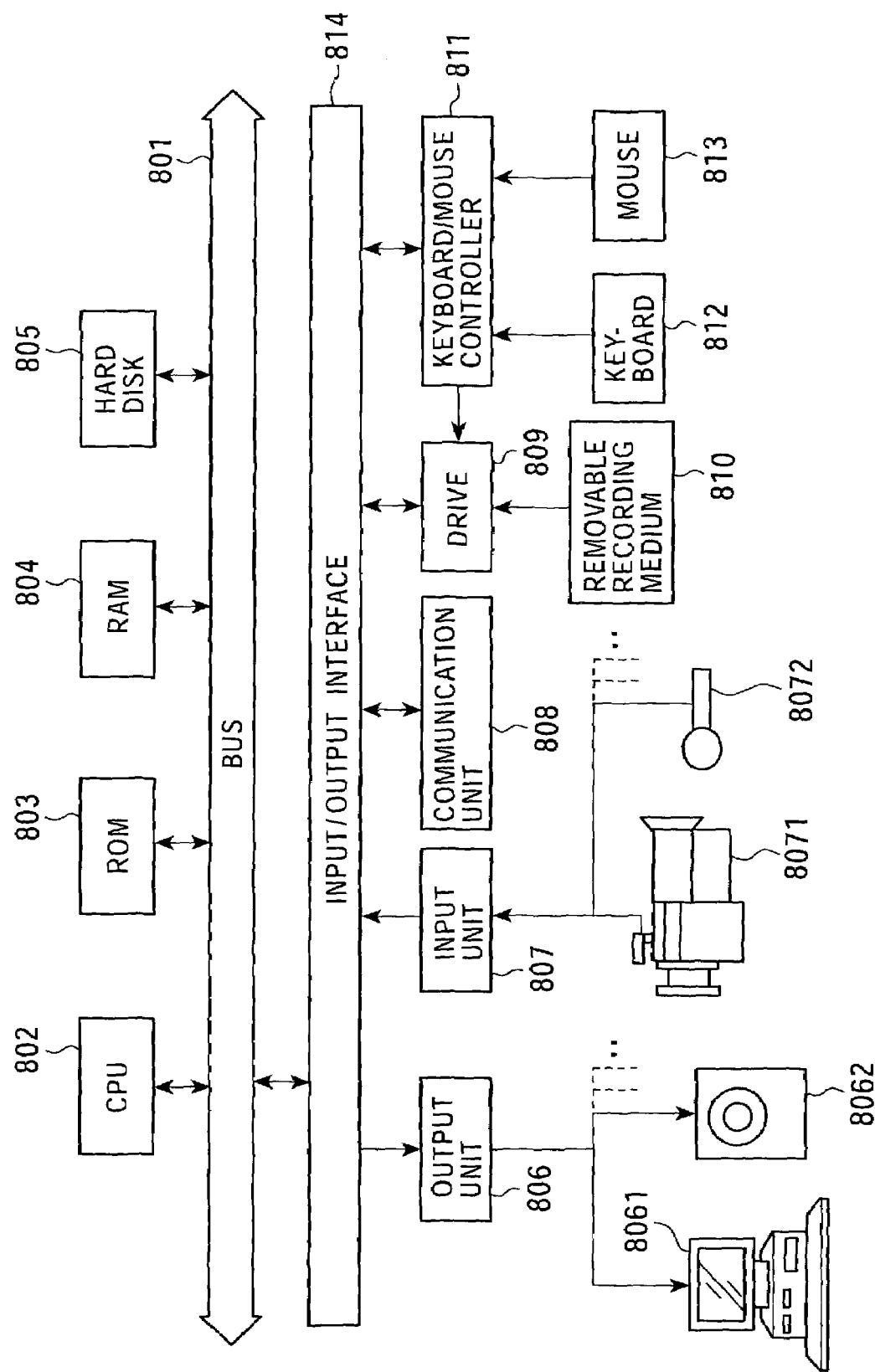

DIGITAL WATERMARK EMBEDDING APPARATUS AND METHOD, AND COMPUTER PROGRAM

BACKGROUND OF THE INVENTION

1. Field of the Invention

The present invention relates to technology for embedding/reading additional information such as copyright information and editing information into/from various data such as image data including moving images and still images, music data, and audio data. More particularly, the present invention relates to a digital watermark embedding (may also be referred to as "data hiding") apparatus and method and a computer program for embedding a digital watermark as additional information imperceptible to normal visual or auditory observation into image data or audio data.

2. Description of the Related Art

As digital technology progresses, digital recorder/players that do not cause deterioration in image quality and sound quality due to repetitive recording and playing have become widely used. At the same time, various types of digital content such as images and music content have become distributable through media such as digital VCRs (videocassette recorders), DVDs (digital versatile disks), and CD (compact discs) and networks.

Unlike analog recording and playing, digital recording and playing do not cause deterioration of data even when recording and playing are repeatedly performed. As a result, the same quality as that of the original data can be maintained. The widely spread use of digital recording and playing technology allows for an excess of illegal copying. This is a serious problem in view of copyright protection.

In order to protect digital content against copyright infringement by illegal copying, the following scheme is devised. Specifically, the scheme involves adding copy control information to digital content, reading the copy control information when the content is recorded or played, and performing processing in accordance with the read copy control information, thus preventing illegal copying.

There are various content control schemes. A typical scheme employs, for example, a copy generation management system (CGMS). For an analog video signal (referred to as CGMS-A), the CGMS scheme superimposes copy control information, that is, two bits of 20-bit additional information to be superimposed on an effective video portion of a specific horizontal period, e.g., the 20th horizontal period in case of an NTSC signal, in a vertical blanking interval of a luminance signal. For a digital video signal (referred to as CGMS-D), the CGMS scheme transmits the digital video signal (digital video data) and two bits of copy control information serving as additional information to be inserted into the digital video data.

The two-bit information used in the CGMS scheme (referred to as CGMS information) has the following meanings: "00" means that copying is permitted, "10" means that one copying is permitted (one generation is permitted), and "11" means that copying is prohibited (copying is absolutely prohibited).

The CGMS scheme described above is an example of a typical copy control scheme. There are other schemes for protecting content copyright. For example, digital broadcasting performed by a broadcast station stores a digital copy control descriptor in program schedule information, that is, service information (SI), included in a transport stream (TS) packet forming digital data. When recording data received by a receiver in a recorder, copy generation control in accordance with the descriptor is performed.

The foregoing control information is added as bit data to the header of content and cannot completely eliminate possible illegal alteration of the added data. Digital watermarking is advantageous in eliminating the possibility of data alteration. When content (image data or audio data) is normally played, a digital watermark is imperceptible to vision and auditory senses. Digital watermarks can only be detected/embedded by execution of a specific algorithm or processing by a specific device. A digital watermark is detected when content is processed by a receiver or recorder/player, and processing in accordance with the digital watermark is performed, thus making more reliable control possible.

Information that can be embedded in content by digital watermarking includes not only the above-described copy control information, but also various information such as content copyright information, content processing information, content format information, content editing information, and content playing information.

Information such as a digital watermark that is directly superimposed on an information signal has a strong alteration resistance and is expected to serve as secure additional information. In digital watermarking technology, the quality of a watermarked image may become a problem. Since digital watermarking performs direct signal processing of data to be watermarked (e.g., an image), the quality of the image may deteriorate or the statistic characteristics of the image may be biased, leading to deterioration of the original image. Digital watermarking that does not cause adverse effects on content is highly demanded.

An example of a known method for preventing deterioration of original data involves setting digital watermark embedding parameters in individual data areas in the original data such as an image to be watermarked, and subsequently, again setting a digital watermark superimposing level adjusting parameter (global parameter) in the entire data area taking into consideration the deterioration in image quality.

There are various methods for controlling embedding of digital watermarks. In one method, an amount embedded is increased by utilizing the characteristics of an image. In another method, a digital watermark is embedded at the minimum embedding level so that priority may be given to image quality. There is not yet a digital watermark embedding algorithm, commonly applicable to all information signals such as image or audio data to be watermarked, for both achieving a sufficient digital watermark detecting accuracy and preventing deterioration in image quality. By embedding a digital watermark, the quality of a data signal such as image or audio data may deteriorate, or the reliability of detecting an embedded digital watermark may be reduced.

In the foregoing digital watermark superimposing level controlling method using the global parameter, a first algorithm for determining initial embedding parameters determines substantially an optimal level of superimposing a digital watermark in each data area. Subsequently, the final adjustment involving the global parameter is performed. The optimal parameters initialized by the first algorithm in individual data areas are forcedly changed by setting the global parameter that takes into consideration deterioration in image quality.

Setting the global parameter may not be favorable in view of digital watermark detection. In other words, the initial optimal parameters are set so as to maintain the superimposing level that ensures digital watermark detection. When the initial optimal parameters are changed by setting the global parameter, the sufficient detection level may not be achieved.

SUMMARY OF THE INVENTION

In order to solve the above problems encountered with the related art, it is an object of the present invention to provide a digital watermark embedding apparatus and method and a computer program for performing digital watermark embedding by selectively applying various different digital watermark embedding algorithms in accordance with individual data areas in data to be watermarked, thus lessening quality deterioration caused by additional information (digital watermarks) embedded in information signals such as image or audio data and ensuring reliable detection of the additional information.

According to a first aspect of the present invention, a digital watermark embedding apparatus for performing digital watermark embedding is provided including a superimposing portion selecting unit for dividing data to be watermarked into data areas; a superimposing level determining unit for selecting and determining beforehand which digital watermark embedding algorithm to apply to each of the data areas generated by the superimposing portion selecting unit from among a plurality of applicable algorithms; a digital watermark generating unit for generating digital watermark information based on additional information to be embedded as a digital watermark; a digital watermark level controlling unit for generating, on the basis of the digital watermark information generated by the digital watermark generating unit, a digital watermark pattern in which the digital watermark embedding algorithm determined by the superimposing level determining unit is applied; and a digital watermark superimposing unit for embedding the digital watermark pattern output by the digital watermark level controlling unit into the data to be watermarked.

The digital watermark embedding apparatus may further include a user input unit for inputting an instruction, and the algorithm may be selected by the superimposing level determining unit on the basis of the instruction input from the user input unit.

The superimposing portion selecting unit may divide the data to be watermarked into the data areas on the basis of frequency characteristics, and the superimposing level determining unit may select and determine beforehand the digital watermark embedding algorithm to be applied to each of the data areas generated on the basis of the frequency characteristics from among the plurality of applicable algorithms.

The superimposing portion selecting unit may divide the data to be watermarked into the data areas on the basis of edge area determination, and the superimposing level determining unit may select and determine beforehand the digital watermark embedding algorithm to be applied to each of the data areas generated on the basis of the edge area from among the plurality of applicable algorithms.

The superimposing portion selecting unit may divide the data to be watermarked into the data areas in units of time-series data frames, and the superimposing level determining unit may select and determine beforehand the digital watermark embedding algorithm to be applied to each of the data areas generated on the basis of the data frames from among the plurality of applicable algorithms.

The superimposing portion selecting unit may divide the data to be watermarked into the data areas on the basis of space position information, and the superimposing level determining unit may select and determine beforehand the digital watermark embedding algorithm to be applied to each of the data areas generated on the basis of the space position information from among the plurality of applicable algorithms.

The superimposing level determining unit may select and determine beforehand the digital watermark embedding algorithm to be applied to each of the data areas generated by the superimposing portion selecting unit from among the plurality of applicable algorithms, and the plurality of algorithms may include a plurality of algorithms for embedding digital watermarks at different digital watermark embedding levels.

The superimposing portion selecting unit may perform data area division of data subjected to signal transformation including at least one of filtering, encoding, orthogonal transformation, and compression.

According to a second aspect of the present invention, a digital watermark embedding method for performing digital watermark embedding is provided including a superimposing portion selecting step of dividing data to be watermarked into data areas; a superimposing level determining step of selecting and determining beforehand which digital watermark embedding algorithm to apply to each of the data areas generated in the superimposing portion selecting step from among a plurality of applicable algorithms; a digital watermark generating step of generating digital watermark information based on additional information to be embedded as a digital watermark; a digital watermark level controlling step of generating, on the basis of the digital watermark information generated in the digital watermark generating step, a digital watermark pattern in which the digital watermark embedding algorithm determined in the superimposing level determining step is applied; and a digital watermark superimposing step of embedding the digital watermark pattern output in the digital watermark level controlling step into the data to be watermarked.

The digital watermark embedding method may further include a user input step of inputting an instruction, and the algorithm may be selected in the superimposing level determining step on the basis of the instruction input in the user input step.

The superimposing portion selecting step may divide the data to be watermarked into the data areas on the basis of frequency characteristics, and the superimposing level determining step may select and determine beforehand the digital watermark embedding algorithm to be applied to each of the data areas generated on the basis of the frequency characteristics from among the plurality of applicable algorithms.

The superimposing portion selecting step may divide the data to be watermarked into the data areas on the basis of edge area determination, and the superimposing level determining step may select and determine beforehand the digital watermark embedding algorithm to be applied to each of the data areas generated on the basis of the edge area from among the plurality of applicable algorithms.

The superimposing portion selecting step may divide the data to be watermarked into the data areas in units of time-series data frames, and the superimposing level determining step may select and determine beforehand the digital watermark embedding algorithm to be applied to each of the data areas generated on the basis of the data frames from among the plurality of applicable algorithms.

The superimposing portion selecting step may divide the data to be watermarked into the data areas on the basis of space position information, and the superimposing level determining step may select and determine beforehand the digital watermark embedding algorithm to be applied to each of the data areas generated on the basis of the space position information from among the plurality of applicable algorithms.

The superimposing level determining step may select and determine beforehand the digital watermark embedding algorithm to be applied to each of the data areas generated in the superimposing portion selecting step from among the plurality of applicable algorithms, and the plurality of algorithms may include a plurality of algorithms for embedding digital watermarks at different digital watermark embedding levels.

The superimposing portion selecting step may perform data area division of data subjected to signal transformation including at least one of filtering, encoding, orthogonal transformation, and compression.

According to a third aspect of the present invention, a computer program for performing digital watermark embedding is provided including a superimposing portion selecting step of dividing data to be watermarked into data areas; a superimposing level determining step of selecting and determining beforehand which digital watermark embedding algorithm to apply to each of the data areas generated in the superimposing portion selecting step from among a plurality of applicable algorithms; a digital watermark generating step of generating digital watermark information based on additional information to be embedded as a digital watermark; a digital watermark level controlling step of generating, on the basis of the digital watermark information generated in the digital watermark generating step, a digital watermark pattern in which the digital watermark embedding algorithm determined in the superimposing level determining step is applied; and a digital watermark superimposing step of embedding the digital watermark pattern output in the digital watermark level controlling step into the data to be watermarked.

The computer program of the present invention can be provided by various computer-readable storage media, such as a CD, FD (floppy disk), and MO (magneto-optical disk), or by various communications media such as a network for providing the computer program to a general-purpose computer system that can execute various pieces of program code. The provision of the program in a computer readable format enables the computer system to perform processing in accordance with the program.

According to the present invention, a digital watermark embedding apparatus of the present invention has various advantages as described below. The digital watermark embedding apparatus divides data to be watermarked into a plurality of data areas on the basis of the characteristics of the data, in time series, or depending on user selection, and embeds digital watermarks in which different algorithms are applied to the data areas. Unlike schemes that embed a digital watermark by applying a uniform algorithm to each data area, the digital watermark embedding apparatus of the present invention can perform digital watermark embedding in accordance with each data area in an image.

Also, the algorithm can be selected in accordance with user input. Since the embedding algorithm can be selected in accordance with the characteristics of the human vision or auditory sense, image quality/sound quality control and detection performance improvement are made possible. The deterioration in data quality can be minimized and prevented. When it is difficult to embed a digital watermark into an information signal by applying one algorithm, a different algorithm can be applied. Thus, appropriate embedding based on data characteristics can be performed. A digital watermark can be embedded into data to be watermarked while maintaining the quality of the data, that is, the image quality in case of an image or the sound quality in case of audio data.

According to the present invention, unlike schemes that uniformly add a global parameter to the entire data, the algorithm in accordance with each data area can be arbitrarily set. Thus, the detection accuracy can be maintained, leading to the improvement of detection reliability and stability.

According to the present invention, protection against attacks such as illegal reading and alteration of embedded digital watermark information can be enhanced by using a plurality of digital watermark embedding algorithms. Algorithms having different attack resistances are selected in the time, spatial, and frequency domains and used to perform digital watermark embedding. Even when the digital watermark information in one domain is attacked, the digital watermark information in the other domains cannot be read or altered. Thus, the detection of the digital watermark information by a legal detector can be ensured. Accordingly, digital watermarking becomes more reliable and robust.

Further objects, features, and advantages of the present invention will become apparent from the following description of the preferred embodiments with reference to the attached drawings. The word "system" in this specification refers to the logical integrated configuration including a plurality of apparatuses and is not limited to apparatuses in the same casing.

BRIEF DESCRIPTION OF THE DRAWINGS

FIG. 6 is a table showing examples of algorithms selected by a superimposing level determination unit of the digital watermark embedding apparatus of the present invention;

FIG. 13 is a table showing combinations of algorithms selected by the superimposing level determination unit of the digital watermark embedding apparatus; and FIG. 14 is a diagram of the configuration of a system for performing digital watermark embedding.

DESCRIPTION OF THE PREFERRED EMBODIMENTS

With reference to the accompanying drawings, a digital watermark embedding apparatus and method according to the present invention will now be described in detail.

Figure 1:
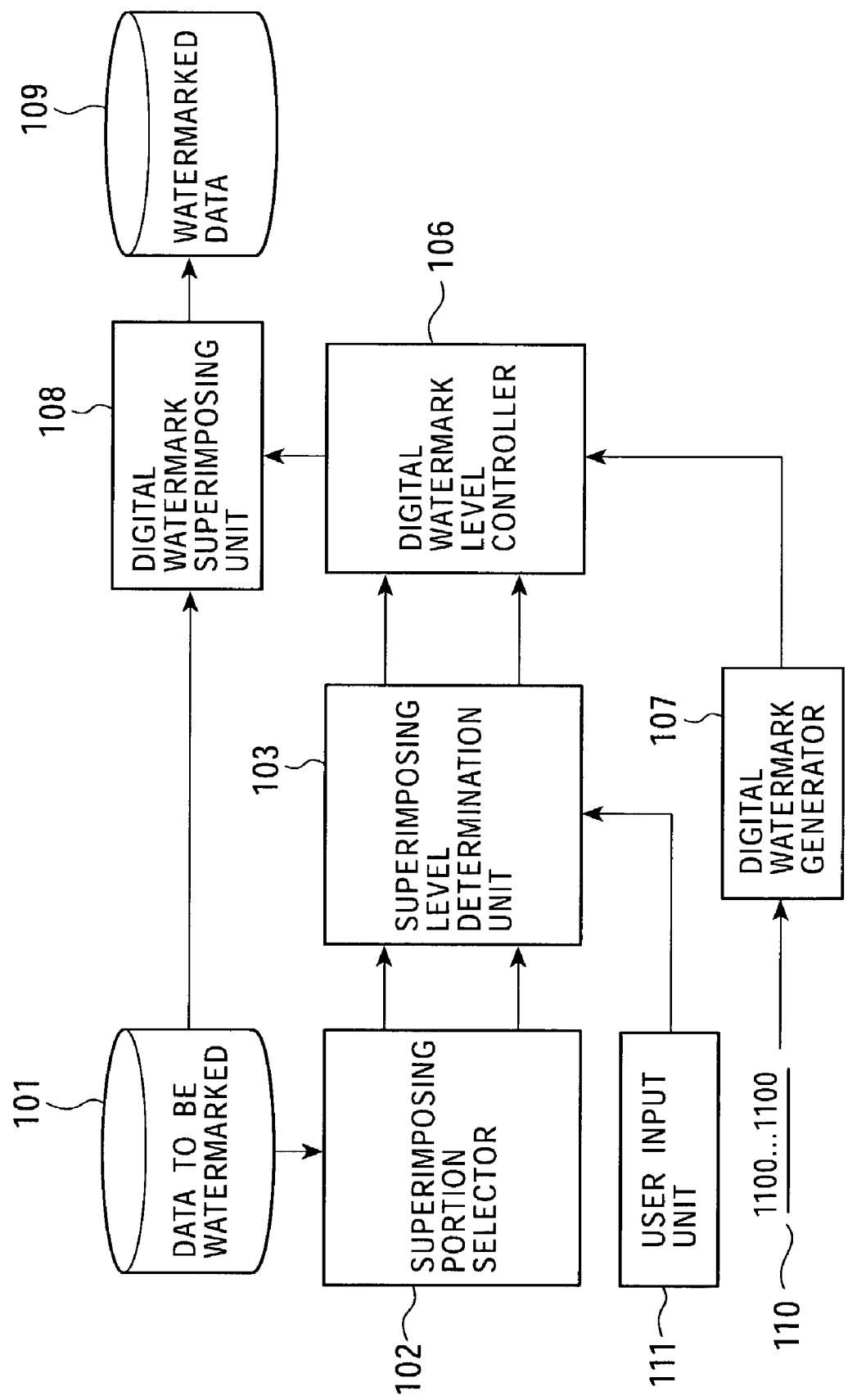
FIG. 1 is a block diagram of an example of the configuration of a digital watermark embedding apparatus of the present invention.

FIG. 1 shows an example of the configuration of a digital watermark pattern embedding apparatus for embedding a digital watermark pattern in data. Referring to FIG. 1, the embedding of a digital watermark pattern in an image will be schematically described. The details of processing by each processor will be described later.

Data to be watermarked 101 includes various types of data, such as an image, audio data, or program data. The data to be watermarked 101 is, for example, an image read from a hard disk or a storage medium such as a DVD or an image supplied from an image scanning device such as a scanner or a digital camera.

The data to be watermarked 101 is output to a superimposing portion selector 102 of the digital watermark embedding apparatus. The superimposing portion selector 102 divides data to be watermarked 101, which is an input signal, into a plurality of portions on the basis of characteristics of the data to be watermarked 101. For example, when image data is to be watermarked 101, the image data is divided into an edge area and the other (edgeless) area or into a high frequency area and a low frequency area. An edge area or high frequency area of image data has a high rate of change in pixel values (pixels forming the image) in a predetermined area. Generally, when a digital watermark is embedded in such an area at a high level, the embedded digital watermark may not be perceptible. In contrast, a low frequency area has uniform pixel values. For example, the "sky" is such an area having uniform luminance and color. When a digital watermark is embedded in such an area at a high embedding intensity (level), the digital watermark becomes perceptible to normal observation. In general, the digital watermark is embedded in such an area at a reduced embedding intensity (level).

The superimposing portion selector 102 analyzes the data to be watermarked 101 and divides the data to be watermarked 101 into a plurality of areas, such as a high frequency area and a low frequency area, on the basis of characteristics of the data to be watermarked 101. The specific processing by the superimposing portion selector 102 will be described later.

The plurality of data areas generated by the superimposing portion selector 102 is output to a superimposing level determination unit 103. The superimposing level determination unit 103 determines which algorithm to apply from among a plurality of prepared digital watermark embedding algorithms. For example, the superimposing level determination unit 103 determines the digital watermark embedding algorithm to be applied to each of the data areas generated by the superimposing portion selector 102 on the basis of user input from a user input unit 111 or preset information. The application processing of the plurality of algorithms will be described in detail in the later part of the description. The superimposing level determination unit 103 outputs superimposing level information based on the determined algorithm to a digital watermark level controller 106.

A digital watermark generator 107 modulates additional information to be embedded as a digital watermark 110 and generates digital watermark information. The processing performed by the digital watermark generator 107 involves modulation based on various control information, such as image division information and bit sequence information, used for embedding into an image a digital watermark corresponding to the bit information 110 forming various additional information, such as copy control information, copyright information, and editing information, to be embedded into data.

The digital watermark information generated by the digital watermark generator 107 is output to the digital watermark level controller 106. The digital watermark level controller 106 receives the digital watermark information generated by the digital watermark generator 107 and superimposing level information based on the digital watermark embedding algorithm selected for each data area by the superimposing level determination unit 103, adjusts the digital watermark embedding level for each data area, and outputs a digital watermark pattern whose embedding level is adjusted by applying the algorithm determined by the superimposing level determination unit 103 in each data area to a digital watermark superimposing unit 108.

The digital watermark superimposing unit 108 receives the data to be watermarked 101 and the level-adjusted digital watermark pattern from the digital watermark level controller 106, embeds the digital watermark into the data to be watermarked 101, and outputs the resulting data as watermarked data 109.

This is the outline of the digital watermark embedding processing of the present invention. The details of processing performed by each processor will now be described.

Processing by Superimposing Portion Selector

A specific example of processing performed by the superimposing portion selector 102 shown in FIG. 1 will now be described. The superimposing portion selector 102 analyzes the data to be watermarked 101 and divides the data to be watermarked 101 into a plurality of portions on the basis of characteristics of the data to be watermarked 101.

As described above, when the data to be watermarked 101, which is an input signal, is image data, the superimposing portion selector 102 divides the image data into an edge area and the other (edgeless) area or into a high frequency area and a low frequency area.

Figure 2:
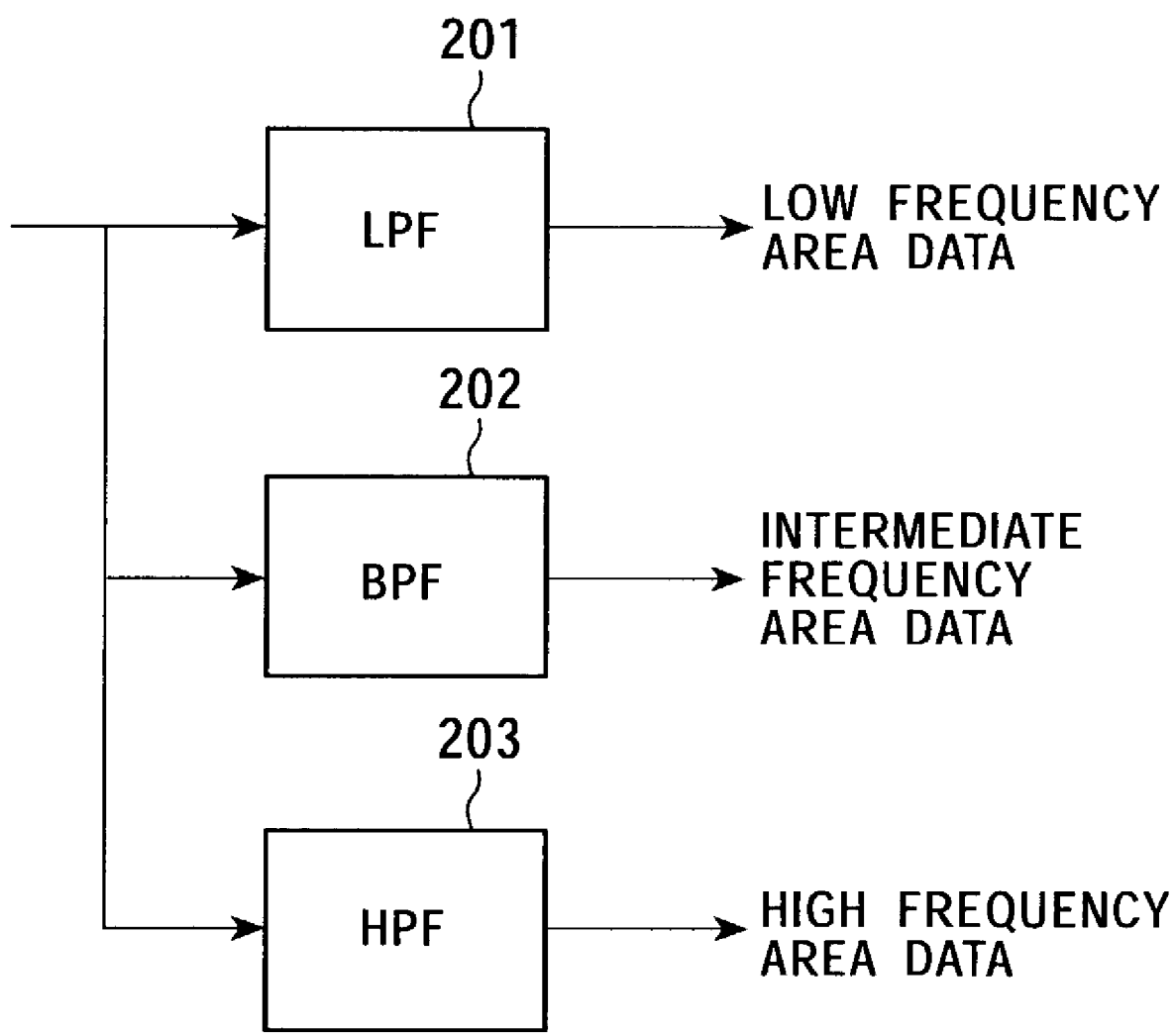
FIG. 2 is a block diagram of an example of the configuration of a superimposing portion selector of the digital watermark embedding apparatus of the present invention.

FIG. 2 shows an example of the configuration of a superimposing portion selector for dividing data into data areas according to frequencies. In this example, the superimposing portion selector includes a low-pass filter (LPF) 201, a band-pass filter (BPF) 202, and a high-pass filter (HPF) 203. Data to be watermarked is input to the filters 201 to 203. The filters 201 to 203 output data in predetermined frequency areas, that is, a low frequency area, a high frequency area, and an intermediate frequency area. The separate pieces of data are output to the superimposing level determination unit 103 shown in FIG. 1. The superimposing level determination unit 103 determines the digital watermark embedding algorithm to be applied to each of the separate pieces of data.

Figure 3:
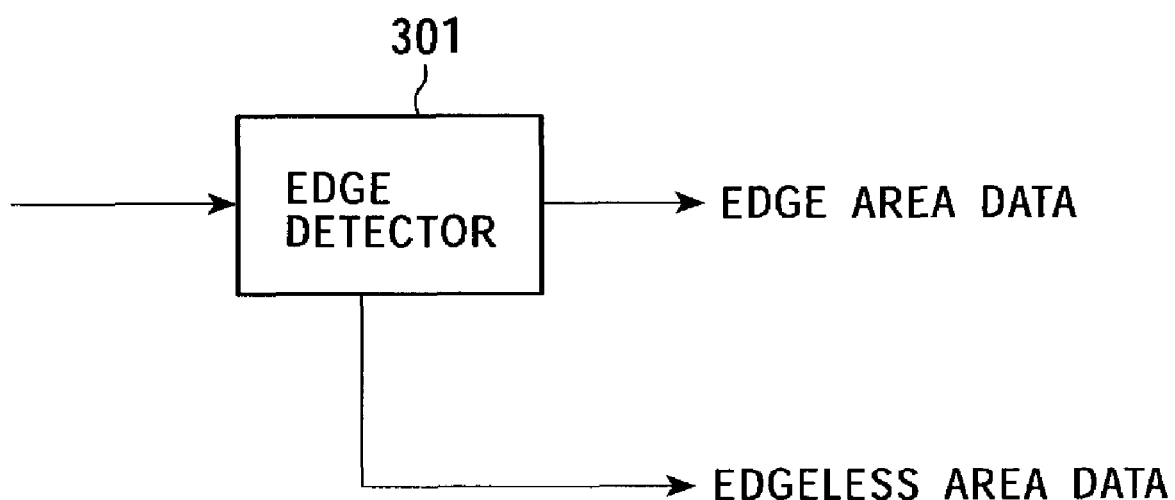
FIG. 3 is a block diagram of an example of the configuration of the superimposing portion selector of the digital watermark embedding apparatus of the present invention.

FIG. 3 shows an example of the configuration of a superimposing portion selector for dividing data into data areas on the basis of edge detection. In this example, the superimposing portion selector includes an edge detector 301. Data to be watermarked is input to the edge detector 301. The edge detector 301 can be formed using a frequency detector. The edge detector 301 divides the input data into an edge area and an edgeless area, which are in turn output to the superimposing level determination unit 103 shown in FIG. 1. The superimposing level determination unit 103 determines the digital watermark embedding algorithm to be applied to each of the separate pieces of data.

Figure 4:
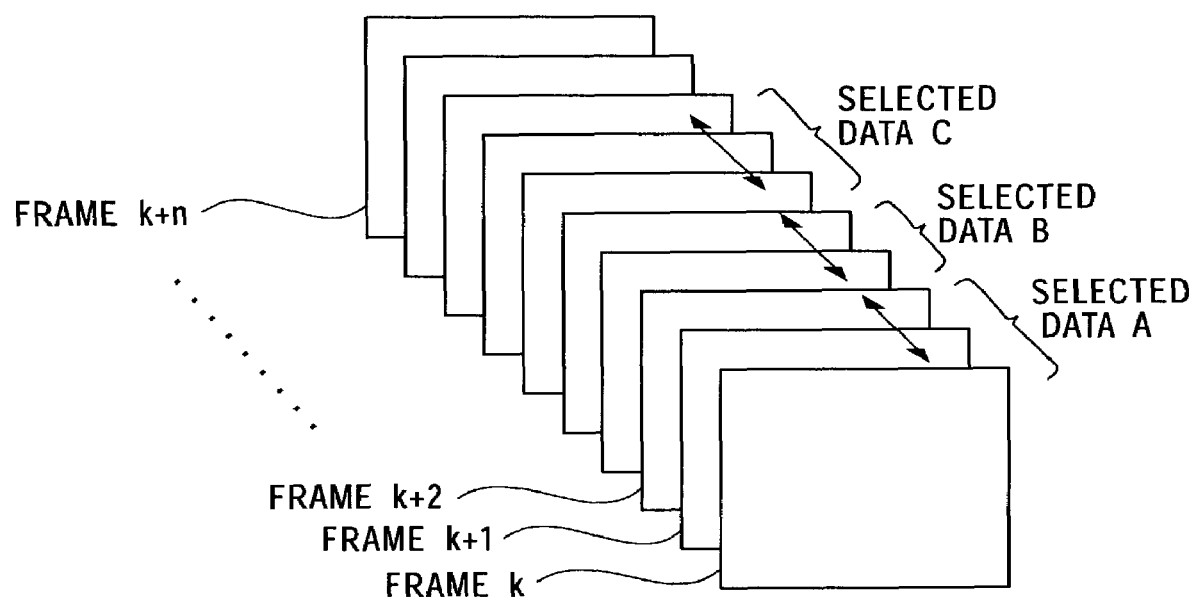
FIG. 4 is a block diagram of an example of the configuration of the superimposing portion selector of the digital watermark embedding apparatus of the present invention.

When input data serving as data to be watermarked is a moving image, a superimposing portion selector can divide data frames, which are input in time series and which form the moving image, into groups of a predetermined number of data frames or into groups at predetermined time intervals. FIG. 4 shows an example of superimposing portion selection processing by frame division. Assuming that the data frames forming the moving image are input starting from frame k, as shown in FIG. 4, the superimposing portion selector divides the frames into groups of a predetermined number of frames or into groups at predetermined time intervals. The separate groups, which are referred to as selected data A, B, C, and so forth, are output to the superimposing level determination unit 103 shown in FIG. 1. The superimposing level determination unit 103 determines the digital watermark embedding algorithm to be applied to each of the separate groups of data.

In addition to dividing the frames according to the number of frames or time, the frame division can be performed in various manners. For example, a scene change or a breakpoint between images or audio data is detected, and the frames are divided at the scene change or breakpoint. Alternatively, the frame division can be performed on the basis of a frequency component distribution, edge-peak distribution, or time difference between frames.

Figure 5:
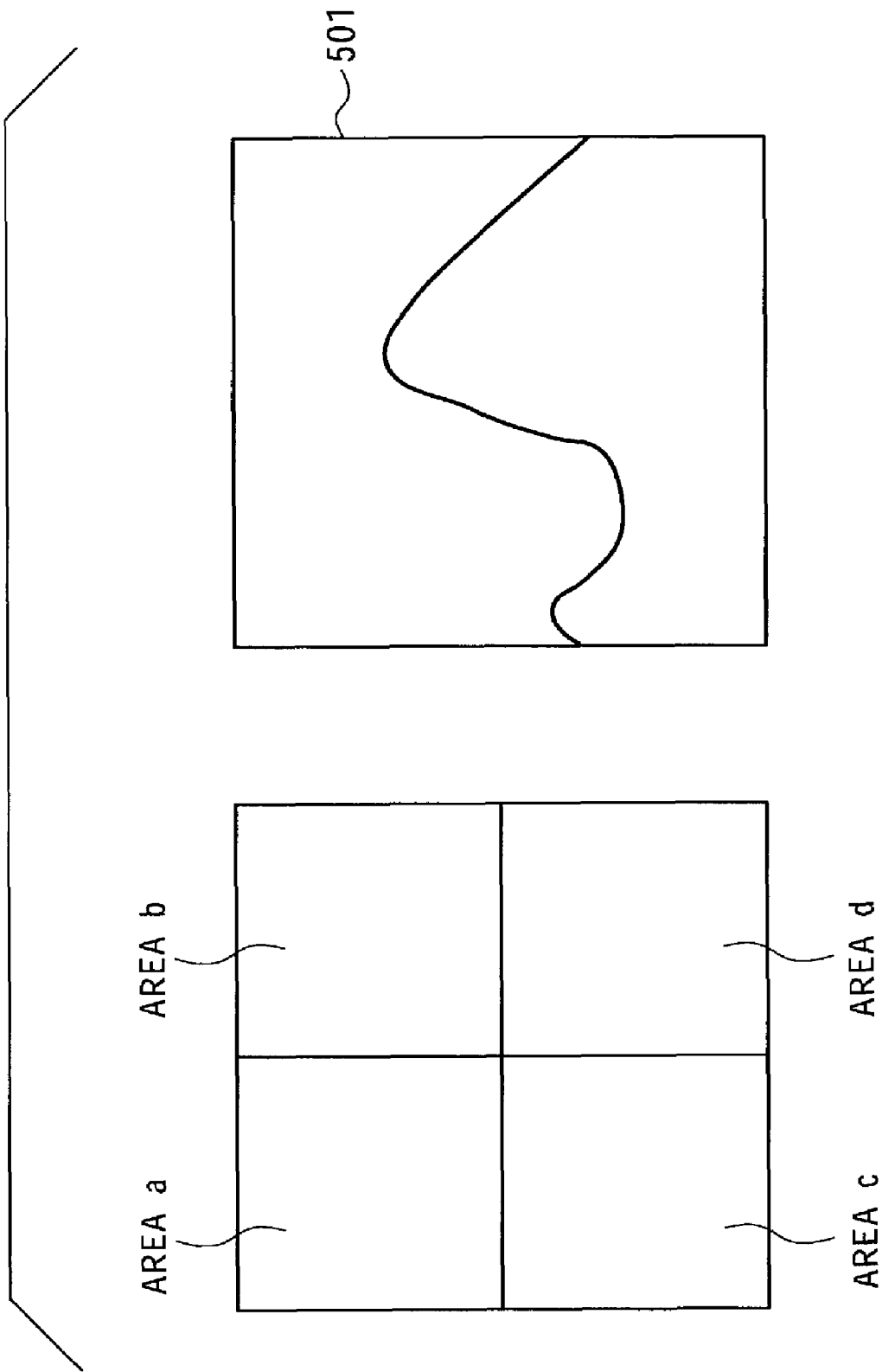
FIG. 5 is a block diagram of an example of the configuration of the superimposing portion selector of the digital watermark embedding apparatus of the present invention.

Referring to FIG. 5, when input data to be watermarked 501 is image data, space division based on space position information can be performed. In the example shown in FIG. 5, the data to be watermarked 501 is divided into four areas a, b, c, and d. The superimposing portion selector divides the image data into a plurality of areas by space division. The separate pieces of data are output to the superimposing level determination unit 103 shown in FIG. 1. The superimposing level determination unit 103 determines the digital watermark embedding algorithm to be applied to each separate piece of data.

In the example shown in FIG. 5, the image data is divided into spatially equal spaces. Alternatively, for example, space division based on the differences in output level through a filter can be performed.

The data division by the superimposing portion selector 102 is not limited to those described in the foregoing examples and can be performed in various processing manners in accordance with data to be watermarked. For example, when data to be watermarked is image data, the image data can be divided in accordance with a luminance level of each pixel. When data to be watermarked is audio data, the audio data can be divided into a plurality of portions in accordance with the audio level.

Processing by Superimposing Level Determination Unit

The separate pieces of data generated by the superimposing portion selector 102 are output to the superimposing level determination unit 103. The superimposing level determination unit 103 is a processor that determines which algorithm to apply from among a plurality of prepared digital watermark embedding algorithms. On the basis of an instruction input from the user input unit 111 or preset information, the superimposing level determination unit 103 determines the digital watermark embedding algorithm to be applied to each of the separate pieces of data generated by the superimposing portion selector 102.

FIG. 6 shows examples of a plurality of algorithms. In FIG. 6, six digital watermark embedding algorithms are shown. Digital watermark embedding processing embeds bit information forming copy control information, copyright information, and editing information, which serve as additional information to be embedded into data. The digital watermark embedding algorithm defines, for example, how data corresponding to bit 1 or bit 0 is embedded into data such as image or audio data.

Prior to describing each algorithm shown in FIG. 6, an example in which a digital watermark is embedded into image data and the embedded digital watermark is detected will now be described. In this example, P represents an original image to be watermarked, and L represents a digital watermark pattern to be embedded into the original image P. The digital watermark pattern L satisfies the following:

$$\Sigma_{i,j} L_{i,j} = 0 \qquad (1)$$

For example, the original image P and the digital watermark pattern L are set as follows:

$$P = \begin{pmatrix} 21 & 22 & 23 & 25 & 24 \\ 22 & 24 & 28 & 30 & 26 \\ 21 & 23 & 27 & 31 & 29 \\ 22 & 25 & 30 & 30 & 28 \end{pmatrix} \qquad (2)$$

$$L = \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix}$$

In equations (2), the size of the original image P is set to 5×4 pixels in order to simplify the description. Images have a characteristic in which adjacent pixels generally have similar values. Thus, adjacent elements in the original image P are set to similar values.

The digital watermark embedding processing is performed on the basis of the following equation:

$$M = P + L \qquad (3)$$

wherein M denotes an image generated by embedding the digital watermark pattern L in the original image P. In the example of equations (2), the value M is computed as follows:

$$M = P + L \qquad (4)$$

$$= \begin{pmatrix} 21 & 22 & 23 & 25 & 24 \\ 22 & 24 & 28 & 30 & 26 \\ 21 & 23 & 27 & 31 & 29 \\ 22 & 25 & 30 & 30 & 28 \end{pmatrix} + \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix}$$

$$= \begin{pmatrix} 20 & 23 & 22 & 26 & 23 \\ 23 & 23 & 29 & 29 & 27 \\ 20 & 24 & 26 & 32 & 28 \\ 23 & 24 & 31 & 29 & 29 \end{pmatrix}$$

The digital watermark detection is performed using the digital watermark pattern L. The digital watermark detection for the original image P having no digital watermark pattern L embedded therein is defined by:

$$s = P \cdot L \qquad (5)$$

wherein the operator · computes the inner product of the matrices, and s is the inner product of the original image P and the digital watermark pattern L.

Since the sum total of elements in the digital watermark pattern L is zero (see equation (1)) and adjacent pixels of the image generally have similar values, the inner product s is a value near zero. In the example illustrated by equations (2), the inner product is:

$$s = P \cdot L \quad (6)$$

$$= \begin{pmatrix} 21 & 22 & 23 & 25 & 24 \\ 22 & 24 & 28 & 30 & 26 \\ 21 & 23 & 27 & 31 & 29 \\ 22 & 25 & 30 & 30 & 28 \end{pmatrix} \cdot \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix}$$

$$= \begin{matrix} -21 & +22 & -23 & +25 & -24 \\ +22 & -24 & +28 & -30 & +26 \\ -21 & +23 & -27 & +31 & -29 \\ +22 & -25 & +30 & -30 & +28 \end{matrix}$$

$$= 3$$

A similar calculation is performed for the watermarked image M. As described above, the digital watermark detection for the watermarked image M having the digital watermark pattern L embedded therein is performed by computing the inner product s' in accordance with the following equation:

$$s' = M \cdot L \quad (7)$$

$$= (P + L) \cdot L$$

$$= P \cdot L + L \cdot L$$

$$= 3 + L \cdot L$$

$$= 3 + \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix} \cdot \begin{pmatrix} -1 & 1 & -1 & 1 & -1 \\ 1 & -1 & 1 & -1 & 1 \\ -1 & 1 & -1 & 1 & -1 \\ 1 & -1 & 1 & -1 & 1 \end{pmatrix}$$

$$= 3 + \begin{matrix} +(1 & +1 & +1 & +1 & +1 \\ +1 & +1 & +1 & +1 & +1 \\ +1 & +1 & +1 & +1 & +1 \\ +1 & +1 & +1 & +1 & +1) \end{matrix}$$

$$= 3 + 20$$

Whereas the inner product s of the original image P and the digital watermark pattern L is a value near zero, the inner product s' of the watermarked image M and the digital watermark pattern L is a value near the inner product of the digital watermark pattern L itself, that is, a value near the following expression:

$$L \cdot L \quad (8)$$

The inner product L·L can be used as a scale for measuring the intensity of embedding a digital watermark. When the inner product L·L, which is the target for embedding a digital watermark, is large, the digital watermark embedding intensity is represented as being "high"; when the inner product L·L is small, the digital watermark embedding intensity is represented as being "low".

Also, when the absolute value of the inner product s of the original image P and the digital watermark pattern L or the inner product s' of the watermarked image M and the digital watermark pattern L is large, the digital watermark detecting intensity is represented as being "high"; when the absolute value of the inner product s or the inner product s' is small, the digital watermark detecting intensity is represented as being "low".

When the digital watermark detecting intensity is high, the correlation between the image and the digital watermark pattern may be represented as being "large" or "high". When the digital watermark detecting intensity is low, the correlation between the image and the digital watermark may be represented as being "small" or "low".

Figure 7:
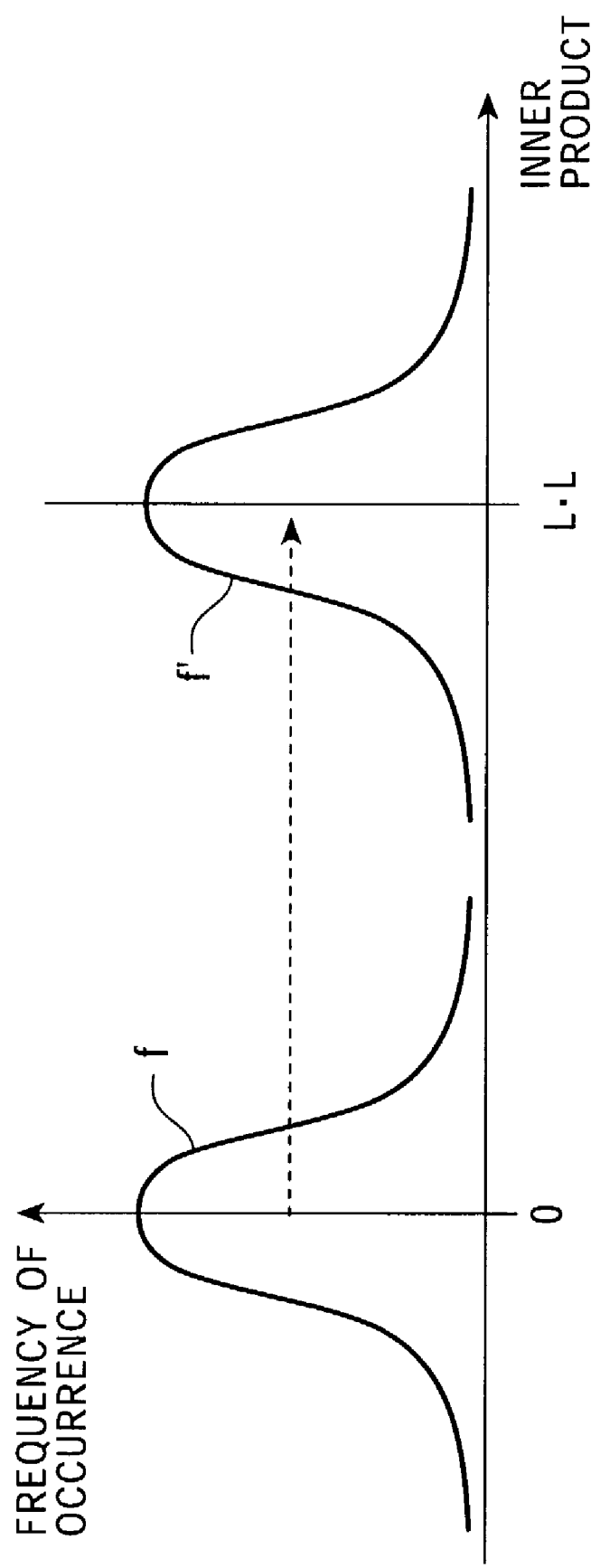
FIG. 7 is a diagram describing relative frequency distributions of inner products of digital watermark patterns.

The inner product s of the original image P and the digital watermark pattern L and the inner product s' of the watermarked image M and the digital watermark pattern L are computed in various images, and the relative frequency distributions thereof are represented by probability density functions f and f', respectively, as shown in FIG. 7.

Whether or not an image is watermarked is determined on the basis of the fact that the inner products s of the unwatermarked image P and the digital watermark pattern L are distributed around zero and the fact that the inner products s' of the watermarked image M and the digital watermark pattern L are distributed around L·L, which is the inner product of the digital watermark pattern L itself. The inner product s" of an image to be checked for a digital watermark and the digital watermark pattern L is computed, and the inner product s" is compared with a threshold (th) to determine the presence of a digital watermark. Specifically, the following expressions are applicable:

s"<th, then no-watermark
s"≧th, then watermarked

Figure 8:
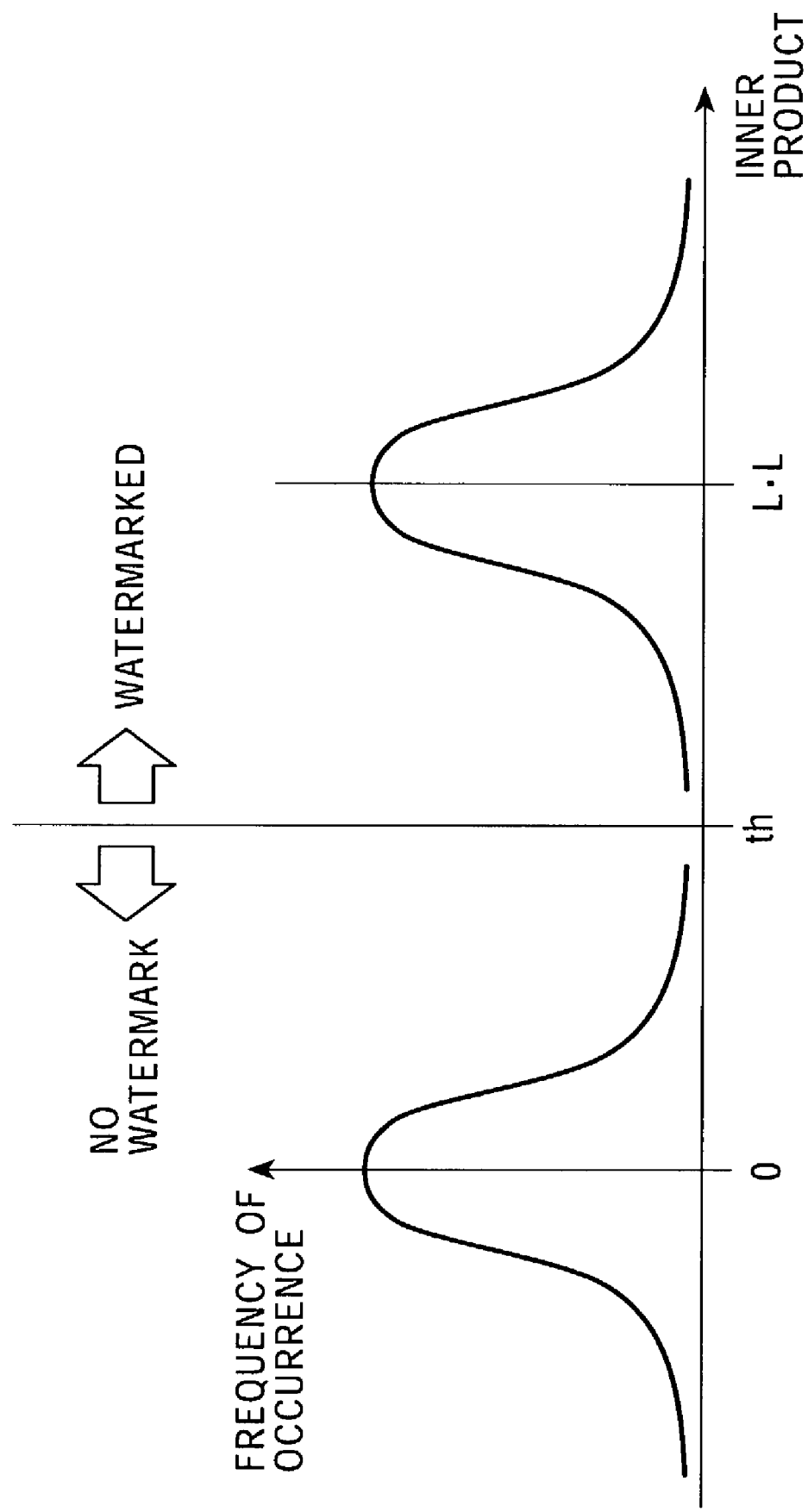
FIG. 8 is a diagram describing a determination reference for determining whether or not data is watermarked.

The above expressions indicate that if the inner product s" of the image to be checked for a digital watermark and the digital watermark pattern L is less than the threshold (th), then it is determined that the image is not watermarked, and if the inner product s" is greater than or equal to the threshold (th), then it is determined that the image is watermarked. The expressions are illustrated in FIG. 8.

Methods for embedding multi-bit information as a digital watermark into an image can be classified into methods using a plurality of digital watermark patterns, methods involving division of an image into sub-areas, and methods combining the foregoing two types of methods.

Figure 9:
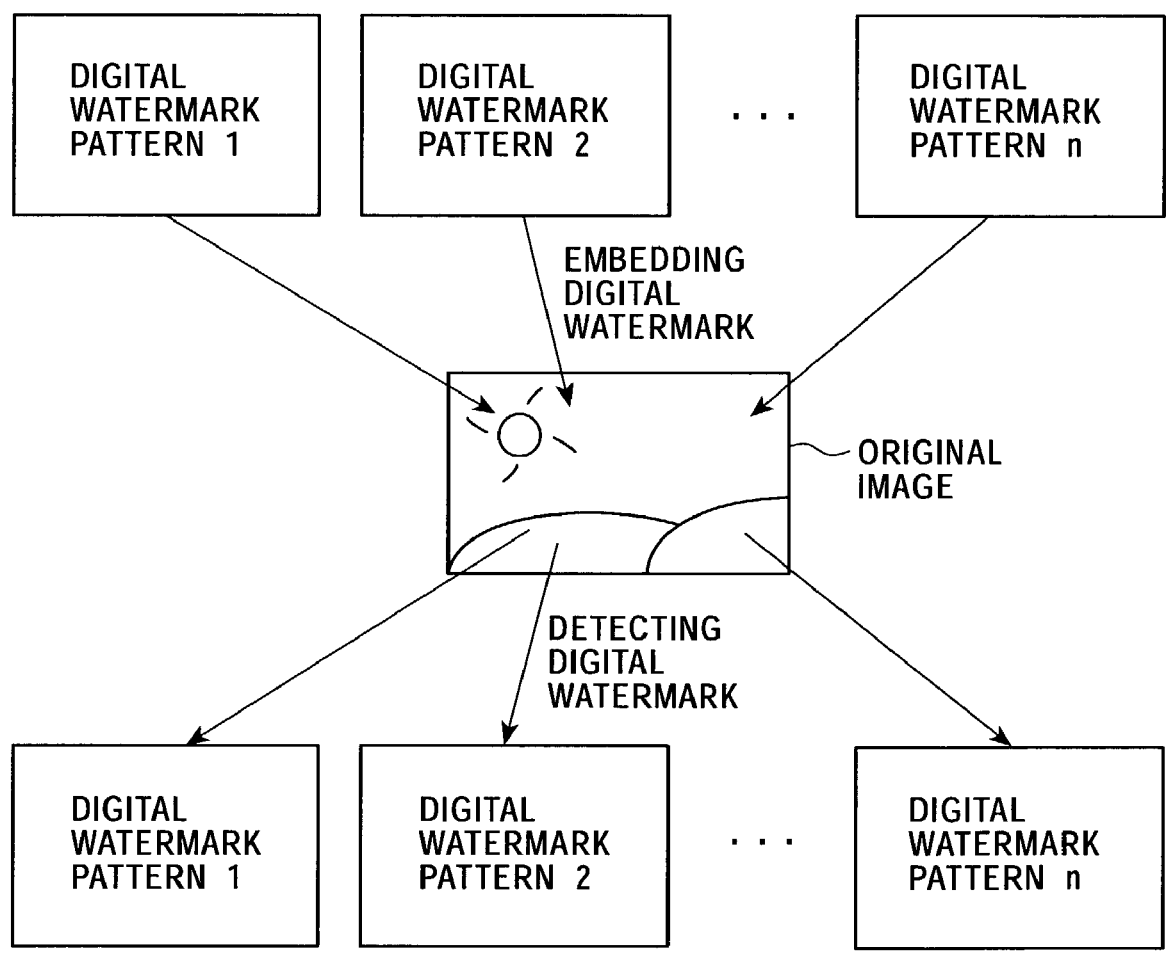
FIG. 9 illustrates embedding of a plurality of digital watermark patterns into an image.

The methods using a plurality of digital watermark patterns can be classified into three types: methods in which the digital watermark patterns are each given a different meaning and exclusively embedded to represent desired information; methods in which a plurality of digital watermark patterns are overlappingly embedded at the same time into an image, whereby desired information is represented by a combination of the digital watermark patterns; and methods combining the two types of methods. FIG. 9 shows embedding of a plurality of digital watermark patterns into an original image.

In the methods in which the digital watermark patterns are each given a different meaning and exclusively embedded to represent desired information, when b represents the number of bits of information to be embedded into the image, the number of types of digital watermark patterns required n is $n=2^b$. In contrast, in the methods in which a plurality of digital watermark patterns are overlappingly embedded at the same time into an image, whereby desired information is represented by a combination of the digital watermark patterns, the number of types of digital watermark patterns required n is n=b. The latter type requires a smaller number of types of digital watermark patterns. However, because a plurality of digital watermark patterns are overlappingly embedded into the image, appropriate processing to prevent deterioration may often be necessary. In the last method type combining the foregoing two types of methods, the number of types of digital watermark patterns required n is $b \leq n \leq 2^b$, and this method has the features of the two types of methods.

Figure 10:
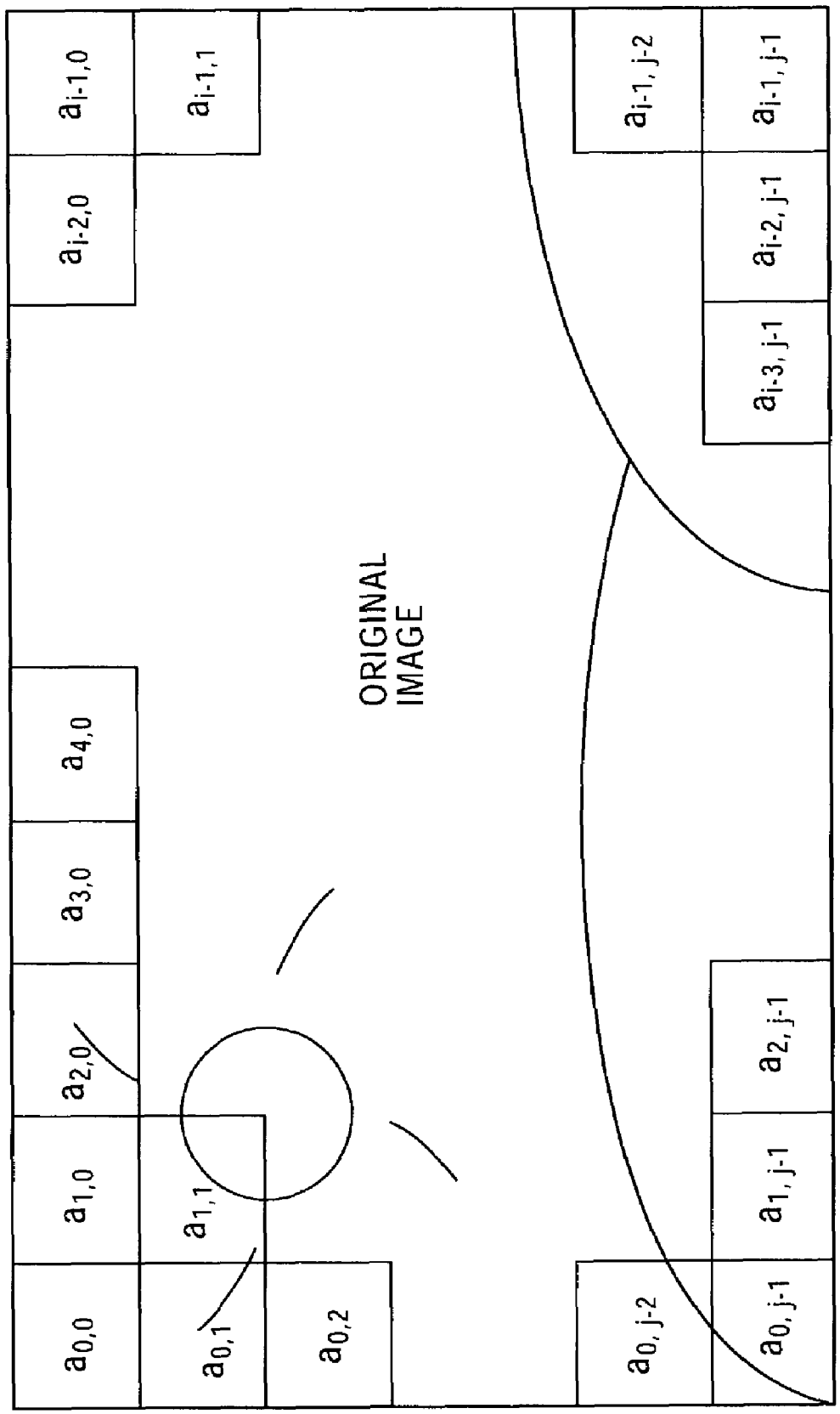
FIG. 10 illustrates division of an original image into sub-areas.

The methods involving division of an image into sub-areas are another type of methods for embedding multi-bit information as a digital watermark into an image. By assigning a different function to each of the sub-areas, a plurality of digital watermarks can exist at the same time in the image. Various sub-area arrangements are proposed. In the description, for example, as shown in FIG. 10, the sub-areas are arrayed in a grid. In FIG. 10, i and j denote non-negative integers.

When an image is divided into sub-areas, the number of partitions is crucial. When information to be embedded into an image has b bits, the image may be divided into b sub-areas. Disadvantageously, this method may cause a problem because, when various images are to be watermarked, digital watermarking is performed taking into consideration visual characteristics of the images. For example, when digital watermarking is performed such that an edge area of an image is subjected to a high embedding intensity while a flat portion is subjected to a low embedding intensity, if a sub-area corresponding to a bit happens to be the flat area, the digital watermark embedded in that sub-area may not be detectable. If the digital watermark detection for one sub-area fails; even when digital watermarks embedded in the remaining sub-areas are detected, the combination of the digital watermarks represents no meaningful information. Dividing an image into sub-areas greater than b is advantageous in that digital watermarks can be stably detected from various images. Even when a sub-area has a very low digital watermark embedding intensity, if the remaining sub-areas (into which the same bit information is embedded) have a sufficient digital watermark pattern embedding intensity, the digital watermark can be detected from the entire image.

Figure 11:
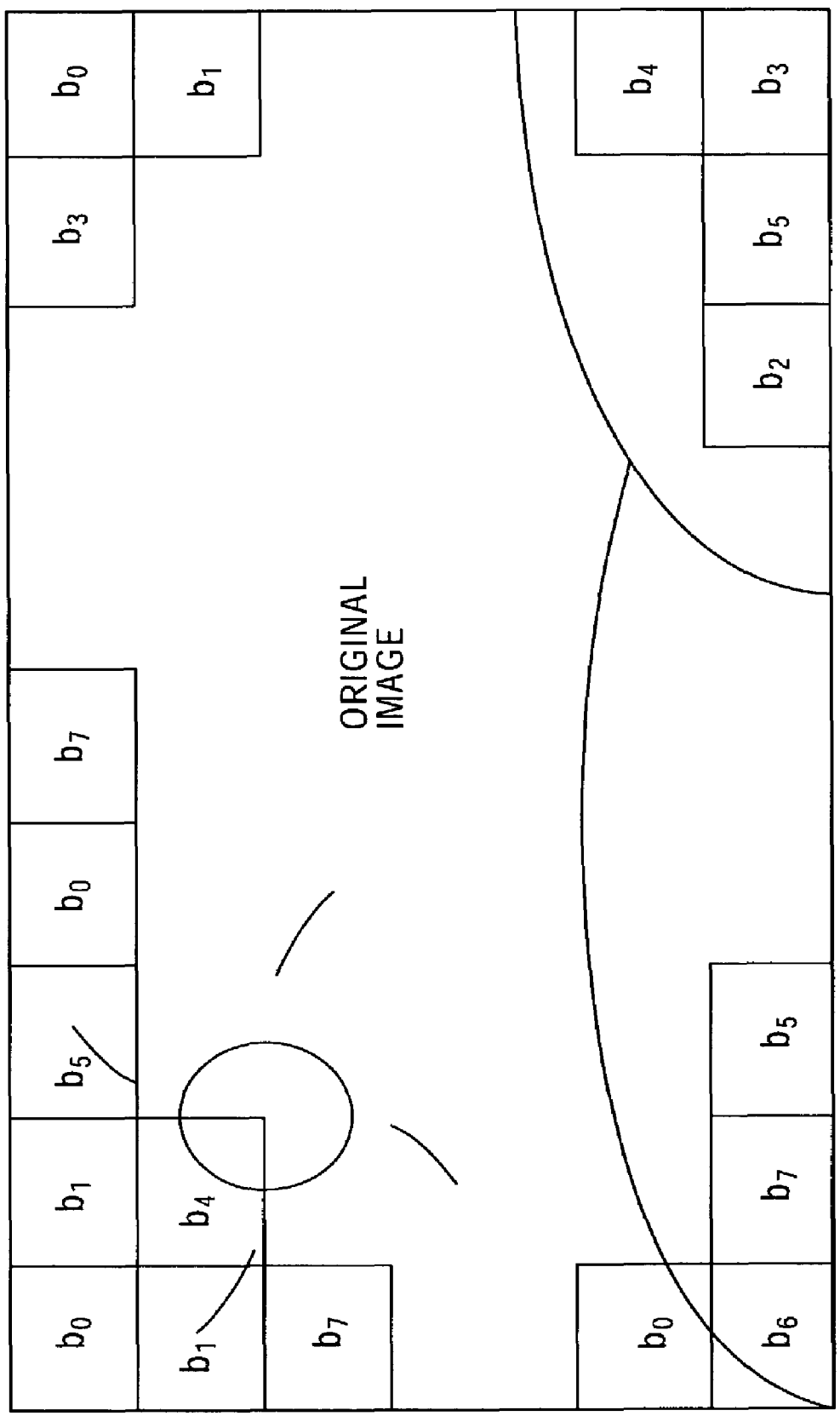
FIG. 11 illustrates allocation of the same information bit to a plurality of sub-areas.

FIG. 11 shows an example in which an image is divided into sub-areas when information to be embedded has eight bits. A plurality of sub-areas corresponding to the same bit is allocated in the image.

Figure 12:
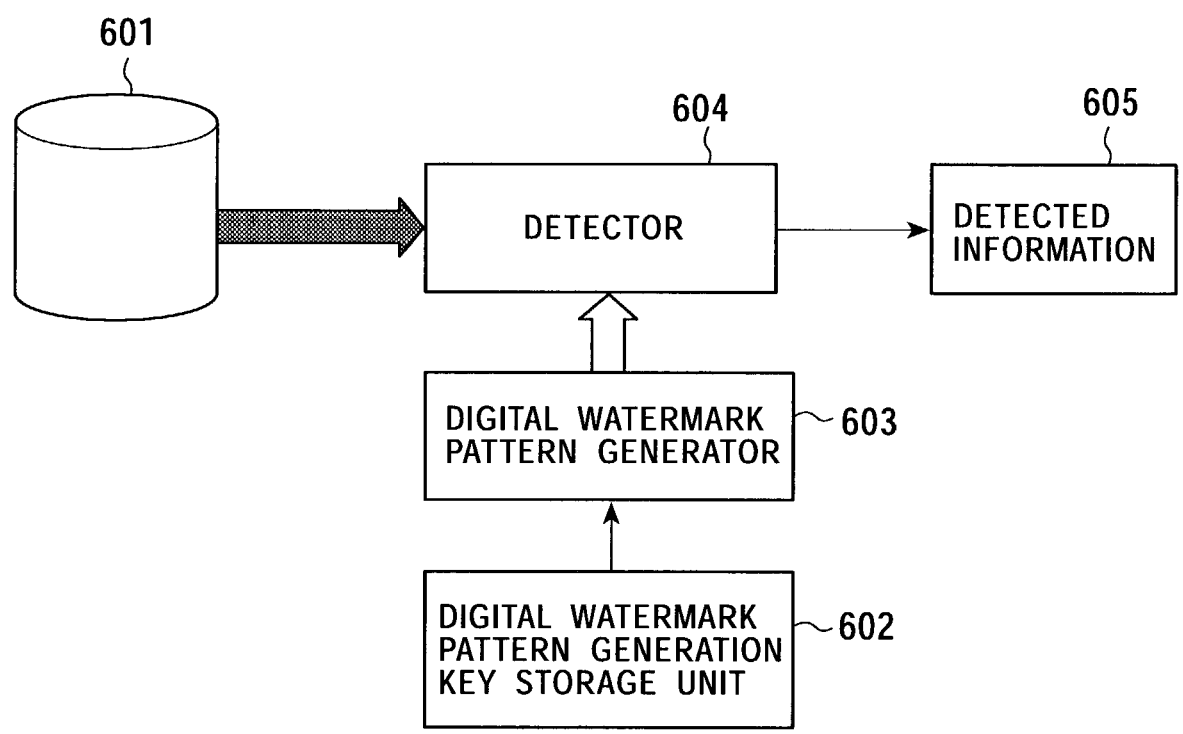
FIG. 12 illustrates a process performed by a digital watermark detector.

FIG. 12 shows an example of the configuration of a digital watermark detector for detecting a digital watermark from a watermarked image. Referring to FIG. 12, digital watermark detection processing will now be described.

An image 601 is an example of watermarked data to be checked for a digital watermark. The image data 601 includes various images, such as an image read from a hard disk or a storage medium such as a DVD or an image supplied through a communications system.

A digital watermark pattern generator 603 generates a digital watermark pattern from a digital watermark pattern generation key of a digital watermark pattern generation key storage unit 602. Specifically, the digital watermark pattern generation key includes image division information used when a digital watermark pattern is embedded into an image or bit sequence information. The digital watermark pattern generation key is required for detecting the digital watermark pattern.

A detector 604 uses the digital watermark pattern generated by the digital watermark pattern generator 603 to detect the digital watermark in the input image 601. The detection processing involves, as described above, determining the correlation between the generated digital watermark pattern and the image by the inner product and comparing the computed inner product with the threshold (th) (see expressions (9)). When the image has multi-bit information embedded therein as a digital watermark, as described with reference to FIGS. 9 to 11, the multi-bit information is obtained. The information detected by the detector 604 is output as detected information 605.

Referring back to FIG. 6, the digital watermark embedding algorithm applied by the superimposing level determination unit 103 in the digital watermark embedding apparatus of the present invention will now be described. Referring to FIG. 6, the superimposing level determination unit 103 selects one from among the plurality of algorithms in accordance with the following equations for each of the data areas generated by the foregoing superimposing portion selector 102:

$$L(i,j) = a \text{ (a:const.)} \qquad (1)$$

$$L(i,j) = |-1.0 \ 2.0 \ -1.0| \qquad (2)$$

$$L(i,j) = \begin{pmatrix} -1.0 & -1.0 & -1.0 \\ -1.0 & 8.0 & -1.0 \\ -1.0 & -1.0 & -1.0 \end{pmatrix} \qquad (3)$$

$$L(i,j) = \begin{pmatrix} -0.0 & -1.0 & -0.0 \\ -1.0 & 4.0 & -1.0 \\ -0.0 & -1.0 & -0.0 \end{pmatrix} \qquad (4)$$

$$L(i,j) = \alpha V(i,j) \text{ or } \alpha A(t) \qquad (5)$$

CONTROL BY LUMINANCE OR AUDIO LEVEL $$(6) L(i,j) = \alpha P(m.n) \qquad (10)$$

EMBEDDING IN ACCORDANCE WITH COEFFICIENT VALUE AFTER TRANSFORM (10)

The algorithm identified by the algorithm identifier (1) (hereinafter referred to as the algorithm (1)) embeds a constant value a as digital watermark embedding bit information. The algorithm (2) adds the intensity (e.g., luminance value change) as information (−1.0, 2.0, −1.0) to three data values (e.g., three horizontal pixel values) in a predetermined direction.

The algorithm (3) is, as described above, a matrix-type digital watermark embedding algorithm for embedding an amount of data with an intensity distribution indicated by the algorithm (3) into one central data (e.g., a pixel value) and surrounding seven pieces of data (e.g., pixel values). The algorithm (4) is, as in the algorithm (3), a matrix-type digital watermark embedding algorithm for embedding an amount of data with an intensity distribution indicated by the algorithm (4) into one central data (e.g., a pixel value) and horizontally and vertically adjacent pieces of data (e.g., pixel values).

In the algorithm (5), α is a coefficient value. When data to be watermarked is image data, the algorithm (5) generates a control value based on the predetermined coefficient α relative to the luminance value of a pixel. When data to be watermarked is audio data, the algorithm (5) generates a control value based on the predetermined coefficient α relative to an audio level value.

In the algorithm (6), α is a coefficient value, and P(m, n) denotes orthogonally-transformed data to be watermarked. The algorithm (6) generates a control value based on the predetermined coefficient α relative to the orthogonally transformed data.

The superimposing level determination unit 103 of the digital watermark embedding apparatus of the present invention determines the algorithm to be applied to each of the data areas generated by the superimposing portion selector 102 from among the above algorithms (1) to (6). The determination is performed on the basis of user input or preset information.

FIG. 13 shows two examples of combinations of selected algorithms. In the examples shown in FIG. 13, data to be watermarked is divided into two data areas, and different algorithms are applied to the two data areas.

The data to be watermarked is divided into a first sub area, that is, a high frequency (edge) area, and a second sub area, that is, a low frequency (flat) area. The division processing is performed by the superimposing portion selector 102.

In the first example of algorithm selection, the algorithm (4), which is described using FIG. 6 or equations (10), is applied to the high frequency (edge) area, and the algorithm (1) is applied to the low frequency (flat) area. In the second example of algorithm selection, the algorithm (3) is applied to the high frequency (edge) area, and the algorithm (5) is applied to the low frequency (flat) area.

In the examples shown in FIG. 13, the data area is divided into two sub areas, and different algorithms are applied to the two sub areas. When the data area is divided into three or more sub areas, processing is performed to set the algorithm to be applied to each of the sub areas.

Processing by Digital Watermark Level Controller

The digital watermark level controller 106 shown in FIG. 1 receives digital watermark information, which is generated by modulating the bit information 110 forming the copy control information, copyright information, and editing information from the digital watermark generator 107 and superimposing level information corresponding to the digital watermark embedding algorithm selected for each data area from the superimposing level determination unit 103, performs adjustment of the digital watermark embedding level for each data area to generate a digital watermark pattern, and outputs the digital watermark pattern to the digital watermark superimposing unit 108.

For example, given that bit information generated by the digital watermark generator 107 is based on additional information set for an image sub area to be watermarked, and that the superimposing level determination unit 103 selects the first combination of algorithms shown in FIG. 13, when the image area to which the bit information will be added corresponds to the high frequency (edge) area, the algorithm (4) is applied, and when the image area corresponds to the low frequency (flat), the algorithm (1) is applied. The digital watermark level controller 106 thus generates a digital watermark pattern whose level is adjusted by applying different algorithms to the data areas and outputs the digital watermark pattern to the digital watermark superimposing unit 108.

The digital watermark superimposing unit 108 receives the data to be watermarked 101 and the level-adjusted digital watermark pattern from the digital watermark level controller 106, embeds (superimposes) the digital watermark into the data to be watermarked 101, and outputs the watermarked data 109.

As described above, the digital watermark embedding apparatus of the present invention divides data to be watermarked into a plurality of data areas on the basis of the characteristics of the data, in time series, or depending on user selection and performs digital watermark embedding in which different algorithms are applied to the data areas. For example, when the algorithm is selected in accordance with user input, the selected algorithm can be comprehensive, taking into consideration not only the characteristics of information signals but also the characteristics of the human eye. Image quality control and detection performance improvement are made possible, thus minimizing deterioration of quality and allowing the human being to manage the-data quality.

When it is difficult to embed a digital watermark into an information signal by applying one algorithm, a different algorithm can be applied. Thus, appropriate embedding based on data characteristics can be performed. Additional information serving as a digital watermark can be embedded into data to be watermarked while maintaining the quality of the data to be watermarked, that is, the image quality in case of an image or the sound quality in case of audio data.

Unlike schemes that uniformly add a global parameter to the entire data, the digital watermark embedding apparatus of the present invention can arbitrarily set the algorithm in accordance with each data area. Detection accuracy can be maintained, and detection reliability and stability are thus improved. Control that accomplishes the image quality improvement not involving the deterioration of detection performance is made possible. Compared with schemes that use a global parameter to perform overall adjustment, the total performance can be ensured by the present invention.

In the foregoing embodiment, the data to be watermarked is primarily described using image data as an example. However, the data to be watermarked may be a video signal, image information, music, an audio signal, MIDI, and other information signals. An information signal may be a baesband signal or a compressed signal. The embedding algorithm can be selected for each sub area of the data to be watermarked, or can be selected in the time or frequency domains. Instead of dividing the data to be embedded into a plurality of pieces, the entire data can be watermarked using one algorithm. If necessary, in response to a user instruction, the embedding algorithm can be changed, for example, in the time domain. In this case, embedding may be switched.

Instead of selecting the digital watermark embedding algorithm in accordance with a user instruction, the digital watermark embedding algorithm may be selected algorithmically. Alternatively, the digital watermark embedding algorithm may be selected algorithmically while taking into consideration the user selection. Instead of dividing data to be watermarked into sub areas, to which algorithms are applied, on the basis of the characteristics of the data, the data can be divided on the basis of positional information or in the time or spatial domain of the data. Additional information may be coded by spread spectrum or patchwork techniques.

The division processing of data to be watermarked may be performed for transformed data areas in the spatial, frequency, and time domains, which have been subjected to signal transformation including various filters, encoding, orthogonal transforms, compression, such as DCT, wavelet transforms, JPEG, MPEG, fractal transforms, ATRACK, MP3, AC3, AAC, ADPCM, CELP, and TwinV.

System Configuration

The series of processes described in the foregoing embodiment can be executed by hardware, software, or a combination of both. When processing is performed by software, a program having recorded a processing sequence therein is installed into a memory in a data processor incorporated in dedicated hardware and thus executed, or, alternatively, the program is installed into a general-purpose computer capable of performing various processes and thus executed. When the series of processes is performed by software, the program forming the software is installed into, for example, a general-purpose computer or a one-chip microcomputer. FIG. 14 shows an example of the system configuration of an apparatus for performing at least one of digital watermark generation, embedding, and detection. The configuration shown in FIG. 14 will now be described.

A CPU (Central Processing Unit) 802 actually executes various application programs and an OS (Operating System). A ROM (Read-Only-Memory) 803 stores the programs executed by the CPU 802 and fixed data serving as operation parameters. A RAM (Random Access Memory) 804 is used as a storage area or work area for the programs executed by the CPU 802 and the parameters changing in accordance with the programs. The CPU 802, the ROM 803, the RAM 804, and a hard disk 805 are connected with one other by a bus 801 and can transmit data to one another. Also, the CPU 802, ROM 803, RAM 804, and hard disk 805 can transmit data to various input/output apparatuses connected to an input/output interface 814.

A keyboard 812 and a mouse 813 are operated by a user to input various commands to the CPU 802. When inputting command input data, the user operates the keyboard 812 and mouse 813 and inputs the data via a keyboard/mouse controller 811.

A drive 819 reads/writes a removable recording medium 801 such as a floppy disk, CD-ROM (Compact Disc Read Only Memory), MO (Magneto Optical) disc, DVD (Digital Versatile Disc), magnetic disk, or semiconductor memory. The drive 819 reads a program and/or data from the removable recording medium 810 and/or stores a program and/or data in the removable recording medium 810.

When a command is input via the input/output interface 814, keyboard 812, or mouse 813, the CPU 802 executes a program stored in the ROM 803 in accordance with the input command.

Data such as image or audio data to be watermarked or data to be checked for a digital watermark in the foregoing embodiment can be input from a camera 8071 or another input device (e.g., a data input device such as a scanner) connected to an input unit 807 or can be input from the removable recording medium 810 such as the floppy disk, CD-ROM, MO, DVD, magnetic disk, or semiconductor memory. In the present system, audio data can be input from a microphone 8072. Data received via a communication unit 808 can be processed as image data to be watermarked or image data to be checked for a digital watermark.

The CPU 802 may load into the RAM 804 not only programs stored in the ROM 803 but also programs stored in the hard disk 805, programs transmitted from a satellite or a network, received by the communication unit 808, and installed in the hard disk 805, or programs read from the removable recording medium 810 attached to the drive 809 and installed in the hard disk 805, and may execute the programs.

In the present specification, programs may be processed by a computer or by a plurality of computers in a decentralized manner. Furthermore, programs may be transmitted to a remote computer and executed by the remote computer.

While the present invention has been described in detail with reference to what are presently considered to be the preferred embodiments, it is to be understood to those skilled in the art that various modifications and substitutions can be made without departing from the spirit and scope of the present invention. In other words, the present invention has been described using the embodiments only for illustration purposes and should not be interpreted in a limited manner. The scope of the present invention is to be determined solely by the appended claims.

What is claimed is:

1. A digital watermark embedding apparatus for performing digital watermark embedding, comprising:
   superimposing portion selecting means for dividing each frame of data to be watermarked into a plurality of data areas, said superimposing portion selecting means determining borders of each data area based on data characteristics of each data area in the frame;
   superimposing level determining means for selecting and determining beforehand which digital watermark embedding algorithm to apply to each of the data areas in the frame generated by said superimposing portion selecting means from among a plurality of different applicable algorithms based on characteristics of each of the data areas in the frame;
   digital watermark generating means for generating digital watermark information based on additional information to be embedded as a digital watermark;
   digital watermark level controlling means for generating, on the basis of the digital watermark information generated by said digital watermark generating means, a digital watermark pattern in which the digital watermark embedding algorithm determined by said superimposing level determining means is applied; and
   digital watermark superimposing means for embedding the digital watermark pattern output by said digital watermark level controlling means into the data to be watermarked.

2. The digital watermark embedding apparatus according to claim 1, further comprising user input means for inputting an instruction,
   wherein the algorithm is selected by said superimposing level determining means on the basis of the instruction input from the user input means.

3. The digital watermark embedding apparatus according to claim 1, wherein said superimposing portion selecting means divides the data to be watermarked into the data areas on the basis of frequency characteristics, and
   said superimposing level determining means selects and determines beforehand the digital watermark embedding algorithm to be applied to each of the data areas generated on the basis of the frequency characteristics from among the plurality of applicable algorithms.

4. The digital watermark embedding apparatus according to claim 1, wherein said superimposing portion selecting means divides the data to be watermarked into the data areas on the basis of edge area determination, and
   said superimposing level determining means selects and determines beforehand the digital watermark embedding algorithm to be applied to each of the data areas generated on the basis of the edge area from among the plurality of applicable algorithms.

5. The digital watermark embedding apparatus according to claim 1, wherein said superimposing portion selecting means divides the data to be watermarked into the data areas in units of time-series data frames, and
   said superimposing level determining means selects and determines beforehand the digital watermark embedding algorithm to be applied to each of the data areas generated on the basis of the data frames from among the plurality of applicable algorithms.

6. The digital watermark embedding apparatus according to claim 1, wherein said superimposing portion selecting means divides the data to be watermarked into the data areas on the basis of space position information, and said superimposing level determining means selects and determines beforehand the digital watermark embedding algorithm to be applied to each of the data areas generated on the basis of the space position information from among the plurality of applicable algorithms.

7. The digital watermark embedding apparatus according to claim 1, wherein said superimposing level determining means selects and determines beforehand the digital watermark embedding algorithm to be applied to each of the data areas generated by said superimposing portion selecting means from among the plurality of applicable algorithms, and the plurality of algorithms include a plurality of algorithms for embedding digital watermarks at different digital watermark embedding levels.

8. The digital watermark embedding apparatus according to claim 1, wherein said superimposing portion selecting means performs data area division of data subjected to signal transformation including at least one of filtering, encoding, orthogonal transformation, and compression.

9. A digital watermark embedding method for performing digital watermark embedding, comprising:

a superimposing portion selecting step of dividing each frame of data to be watermarked into a plurality of data areas, said superimposing portion selecting step including determining borders of each data area based on data characteristics of each data area in the frame;

a superimposing level determining step of selecting and determining beforehand which digital watermark embedding algorithm to apply to each of the data areas in the frame generated in said superimposing portion selecting step from among a plurality of different applicable algorithms based on characteristics of each of the data areas in the frame;

a digital watermark generating step of generating digital watermark information based on additional information to be embedded as a digital watermark;

a digital watermark level controlling step of generating, on the basis of the digital watermark information generated in said digital watermark generating step, a digital watermark pattern in which the digital watermark embedding algorithm determined in said superimposing level determining step is applied; and a digital watermark superimposing step of embedding the digital watermark pattern output in said digital watermark level controlling step into the data to be watermarked.

10. The digital watermark embedding method according to claim 9, further comprising a user input step of inputting an instruction, wherein the algorithm is selected in said superimposing level determining step on the basis of the instruction input in the user input step.

11. The digital watermark embedding method according to claim 9, wherein said superimposing portion selecting step divides the data to be watermarked into the data areas on the basis of frequency characteristics, and said superimposing level determining step selects and determines beforehand the digital watermark embedding algorithm to be applied to each of the data areas generated on the basis of the frequency characteristics from among the plurality of applicable algorithms.

12. The digital watermark embedding method according to claim 9, wherein said superimposing portion selecting step divides the data to be watermarked into the data areas on the basis of edge area determination, and said superimposing level determining step selects and determines beforehand the digital watermark embedding algorithm to be applied to each of the data areas generated on the basis of the edge area from among the plurality of applicable algorithms.

13. The digital watermark embedding method according to claim 9, wherein said superimposing portion selecting step divides the data to be watermarked into the data areas in units of time-series data frames, and said superimposing level determining step selects and determines beforehand the digital watermark embedding algorithm to be applied to each of the data areas generated on the basis of the data frames from among the plurality of applicable algorithms.

14. The digital watermark embedding method according to claim 9, wherein said superimposing portion selecting step divides the data to be watermarked into the data areas on the basis of space position information, and said superimposing level determining step selects and determines beforehand the digital watermark embedding algorithm to be applied to each of the data areas generated on the basis of the space position information from among the plurality of applicable algorithms.

15. The digital watermark embedding method according to claim 9, wherein said superimposing level determining step selects and determines beforehand the digital watermark embedding algorithm to be applied to each of the data areas generated in said superimposing portion selecting step from among the plurality of applicable algorithms, and the plurality of algorithms include a plurality of algorithms for embedding digital watermarks at different digital watermark embedding levels.

16. The digital watermark embedding method according to claim 9, wherein said superimposing portion selecting step performs data area division of data subjected to signal transformation including at least one of filtering, encoding, orthogonal transformation, and compression.

17. A computer readable storage medium with computer readable instructions that when executed by a processor perform a digital watermark embedding process, comprising:

a superimposing portion selecting step of dividing each frame of data to be watermarked into a plurality of data areas, said superimposing portion selecting step including determining borders of each data area based on data characteristics of each data area in the frame;

a superimposing level determining step of selecting and determining beforehand which digital watermark embedding algorithm to apply to each of the data areas in the frame generated in said superimposing portion selecting step from among a plurality of different applicable algorithms based on characteristics of each of the data areas in the frame;

a digital watermark generating step of generating digital watermark information based on additional information to be embedded as a digital watermark;

a digital watermark level controlling step of generating, on the basis of the digital watermark information generated in said digital watermark generating step, a digital watermark pattern in which the digital watermark embedding algorithm determined in said superimposing level determining step is applied; and a digital watermark superimposing step of embedding the digital watermark pattern output in said digital watermark level controlling step into the data to be watermarked.

18. A digital watermark embedding apparatus, comprising:
  a superimposing portion selecting unit configured to select and divide each frame of data to be watermarked into a plurality of data areas, said superimposing portion selecting unit configured to determine borders of each data area based on data characteristics of each data area in the frame;
  a superimposing level determining unit configured to select and determine beforehand which digital watermark embedding algorithm to apply to each of the data areas in the frame generated by said superimposing portion selecting unit from among a plurality of different applicable algorithms based on characteristics of each of the data areas in the frame;
  a digital watermark generating unit configured to generate digital watermark information based on additional information to be embedded as a digital watermark;
  a digital watermark level controlling unit configured to generate, on the basis of the digital watermark information generated by said digital watermark generating unit, a digital watermark pattern in which the digital watermark embedding algorithm determined by said superimposing level determining unit is applied; and
  a digital watermark superimposing unit configured to embed the digital watermark pattern output by said digital watermark level controlling unit into the data to be watermarked.

19. The digital watermark embedding apparatus according to claim 1, wherein the superimposing level determining means selects a different digital watermark embedding algorithm to apply to a first data area in the frame of data than a digital watermark embedding algorithm to apply to a second data area in the frame of data.

20. The method according to claim 9, further comprising:
  selecting a different digital watermark embedding algorithm to apply to a first data area in the frame of data than a digital watermark embedding algorithm to apply to a second data area in the frame of data.

\* \* \* \* \*